(12) United States Patent
Shie et al.

(10) Patent No.: US 11,287,731 B2
(45) Date of Patent: Mar. 29, 2022

(54) OPTICAL MODULE AND PROJECTOR

(71) Applicant: Coretronic Corporation, Hsin-Chu (TW)

(72) Inventors: Jen-Yu Shie, Hsin-Chu (TW); Kuang-Hsiang Chang, Hsin-Chu (TW); Pei-Cheng Liao, Hsin-Chu (TW); Heng Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/126,026

(22) Filed: Dec. 18, 2020

(65) Prior Publication Data
US 2021/0191245 A1 Jun. 24, 2021

(30) Foreign Application Priority Data
Dec. 23, 2019 (CN) .......................... 201922325900.4

(51) Int. Cl.
*G03B 21/20* (2006.01)
*G03B 21/43* (2006.01)

(52) U.S. Cl.
CPC ....... *G03B 21/2046* (2013.01); *G03B 21/206* (2013.01); *G03B 21/43* (2013.01); *G03B 2205/0053* (2013.01)

(58) Field of Classification Search
None
See application file for complete search history.

(56) References Cited

U.S. PATENT DOCUMENTS
2020/0301118 A1* 9/2020 Lin ...................... G03B 21/142

FOREIGN PATENT DOCUMENTS
TW   I245158   12/2005
TW   I631409   8/2018

* cited by examiner

*Primary Examiner* — Michelle M Iacoletti
*Assistant Examiner* — Danell L Owens
(74) *Attorney, Agent, or Firm* — JCIPRNET (57) ABSTRACT

An optical module and a projector having the optical module are provided. The optical module includes a bracket, a driving component, an optical component, and a light guide element. The optical component is movably disposed on the bracket and is located on a transmission path of an image beam. The driving component is disposed between the bracket and the optical component and is configured to drive the optical component to oscillate. The light guide element is disposed at the bracket and located on the transmission path of the image beam. Here, the assembly of the optical module and the projector is easy, and the assembly yield is high.

24 Claims, 12 Drawing Sheets

OPTICAL MODULE AND PROJECTOR

CROSS-REFERENCE TO RELATED APPLICATION

This application claims the priority benefit of China application serial no. 201922325900.4, filed on Dec. 23, 2019. The entirety of the above-mentioned patent application is hereby incorporated by reference herein and made a part of this specification.

BACKGROUND OF THE INVENTION

Field of the Invention

The invention relates to an optical module and a projector.

Description of Related Art

A projector is a display device configured to generate an image. An imaging principle of the projector is to apply a light valve to convert an illumination beam generated by a light source into an image beam and then project the image beam onto a screen or a wall surface by a projection lens. In response to the miniaturization of the projector, each component of an imaging system of the projector is correspondingly designed to have a smaller size to be assembled within the limited configuration space of the miniaturized projector. However, assembling a plurality of components is difficult and requires different jigs, thus increasing the relevant labor and costs. In addition, the cumulative errors resulting from sequentially assembling a plurality of components lead to the decrease in yield.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more alkalinity of the invention was acknowledged by a person of ordinary skill in the art.

SUMMARY OF THE INVENTION

The invention provides an optical module and a projector that may be easily assembled and have a high yield.

Other advantages can be further illustrated by the technical features broadly embodied and described as follows.

In order to achieve one or a part or all of the foregoing objectives or other objectives, an optical module including a bracket, a driving component, an optical component, and a light guide element is provided in an embodiment of the invention. The optical component is movably disposed at the bracket and located on a transmission path of an image beam. The driving component is disposed between the bracket and the optical component and configured to drive the optical component to oscillate. The light guide element is disposed at the bracket and located on the transmission path of the image beam.

In order to achieve one or a part or all of the foregoing objectives or other objectives, a projector including a light source, a light valve component, an optical module, and a projection lens is provided in an embodiment of the invention. The light source is configured to provide an illumination beam. The light valve component is configured to convert the illumination beam into an image beam. The optical module includes a bracket, a driving component, an optical component, and a light guide element. The optical component is movably disposed at the bracket and located on a transmission path of the image beam. The driving component is disposed between the bracket and the optical component and configured to drive the optical component to oscillate. The light guide element is disposed at the bracket and located on the transmission path of the image beam. The projection lens is configured to project the image beam from the light guide element.

In order to achieve one or a part or all of the foregoing objectives or other objectives, an optical module including a bracket, a light valve component, and a light guide element is provided in an embodiment of the invention. The light valve component is disposed at the bracket and configured to convert an illumination beam into an image beam. The light guide element is disposed at the bracket and located on a transmission path of the image beam.

In order to achieve one or a part or all of the foregoing objectives or other objectives, a projector including a light source, an optical module, and a projection lens is provided in an embodiment of the invention. The light source is configured to provide an illumination beam. The optical module includes a bracket, a light valve component, and a light guide element. The light valve component is disposed at the bracket and configured to convert the illumination beam into an image beam. The light guide element is disposed at the bracket and located on a transmission path of the image beam. The projection lens is configured to project the image beam from the light guide element.

In view of the foregoing, one or more embodiments of the invention provide at least one of the following advantages or effects. In the optical module provided in one or more embodiments of the invention, the components (such as the driving component, the optical component, and the light guide element, or the light valve component and the light guide element) share one single bracket and are modularized. Therefore, in the process of assembling the projector, as long as the modularized components are installed in a casing of the projector, it is equivalent to the assembly of a plurality of components; hence, the assembly process provided herein is relatively simple and does not require the use of different fixtures to assemble the components. As such, the relevant labor and costs may be reduced, and the reduced yield caused by cumulative errors resulting from sequentially assembling the components may be avoided.

Other objectives, features and advantages of the invention will be further understood from the further technological features disclosed by the embodiment of the invention hereinafter there are shown and described preferred embodiment of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate example of the invention and, together with the description, serve to explain the principles of the invention.

DESCRIPTION OF THE EMBODIMENTS

In the following detailed description of the preferred alternative, reference is made to the accompanying drawings which form a part hereof, and in which are shown by way of illustration specific example in which the invention may be practiced. In this regard, directional terminology, such as "top," "bottom," "front," "back," etc., is used with reference to the orientation of the Figure (s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other alternative may be utilized and structural changes may be made without departing from the scope of the invention. Also, it is to be understood that the phraseology and terminology used here are for the purpose of description and should not be regarded as limiting. The use of "including," "comprising," or "having" and variations thereof here is meant to encompass the items listed thereafter and equivalents thereof as well as additional items. Unless limited otherwise, the terms "connected," "coupled," and "mounted" and variations thereof here are used broadly and encompass direct and indirect connections, couplings, and mountings. Similarly, the terms "facing," "faces," and variations thereof here are used broadly and encompass direct and indirect facing, and "adjacent to" and variations thereof here are used broadly and encompass directly and indirectly "adjacent to". Therefore, the description of "A" component facing "B" component here may contain the situations that "A" component directly faces "B" component or one or more additional components are between "A" component and "B" component. Also, the description of "A" component "adjacent to" "B" component here may contain the situations that "A" component is directly "adjacent to" "B" component or one or more additional components are between "A" component and "B" component. Accordingly, the drawings and descriptions will be regarded as Illustrative in nature and not as restrictive.

Figure 1:
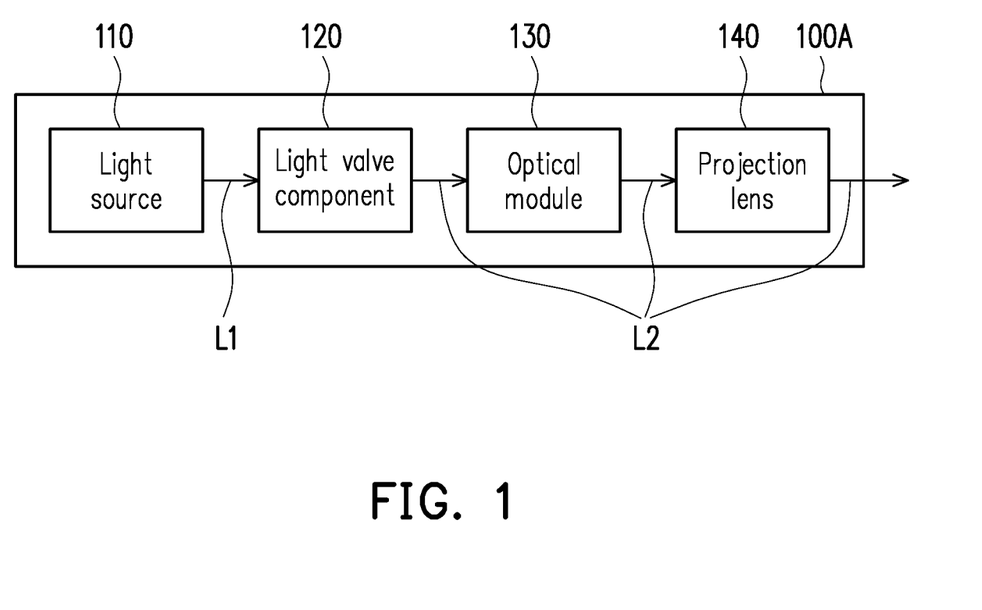
FIG. 1 is a schematic block diagram of a projector according to an embodiment of the invention.
Figure 2:
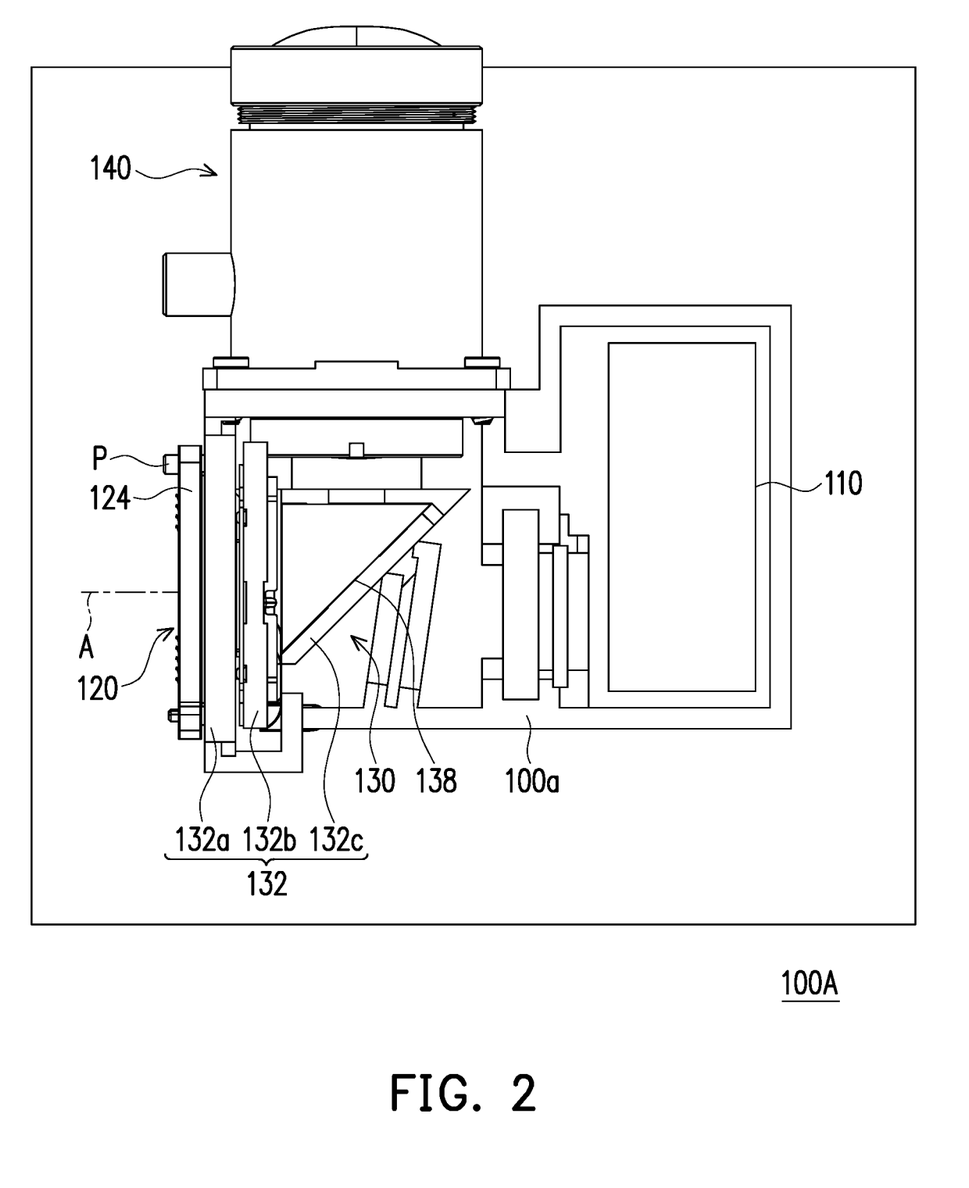
FIG. 2 is a schematic top view of the projector in FIG. 1.

FIG. 1 is a schematic block diagram of a projector according to an embodiment of the invention. FIG. 2 is a schematic top view of the projector in FIG. 1. With reference to FIG. 1 and FIG. 2, a projector 100A provided in the embodiment includes a light source 110, a light valve component 120, an optical module 130, and a projection lens 140. The light source 110 is configured to provide an illumination beam L1. FIG. 2 schematically illustrates the light source 110, and the light source 110 may include a plurality of light emitting elements, for instance, plurality of light emitting diodes or other types of light sources. The light valve component 120 is configured to convert the illumination beam L1 to an image beam L2. In this embodiment, the light valve component 120 is a digital micromirror device (DMD), for instance. In other embodiments, the light valve component 120 may also be a reflective light modulator, e.g., a liquid crystal on silicon (LCOS) panel; alternatively, the light valve component 120 may also be a transparent light modulator, such as a transparent crystal panel, an electro-optic modulator, a magneto-optic modulator, an acousto-optic modulator (AOM), and so forth. The optical module 130 is disposed on a transmission path of the image beam L2. The projection lens 140 is configured to project the image beam L2. The projection lens 140 includes, for instance, a combination of one or more optical lenses having refractive power, such as various combinations of non-planar lenses including biconcave lenses, biconvex lenses, concave-convex lenses, convex-concave lenses, plano convex lenses, plano concave lenses, and so on. In other embodiments, the projection lens 140 may further include a planar optical lens to project the image beam L2 to the projection target in a reflective manner. The form and the type of the projection lens 140 are not limited hereto. In addition, in other embodiments, the projector 100A may further include other optical elements disposed on a transmission path of the illumination beam L1, such as a wavelength conversion element, a light homogenizing element, a filter element, and a plurality of beam splitting and combining elements, so as to provide beams of different wavelengths as the source of the image beam, adjust light uniformity or light pattern, and guiding light. However, the form and the type of other optical elements in the projector 100A are not limited hereto, and sufficient teachings, suggestions, and implementation descriptions of the detailed structure and manner of implementation may be obtained from the general knowledge of the pertinent field to which they belong and thus will not be repeated herein.

Figure 3:
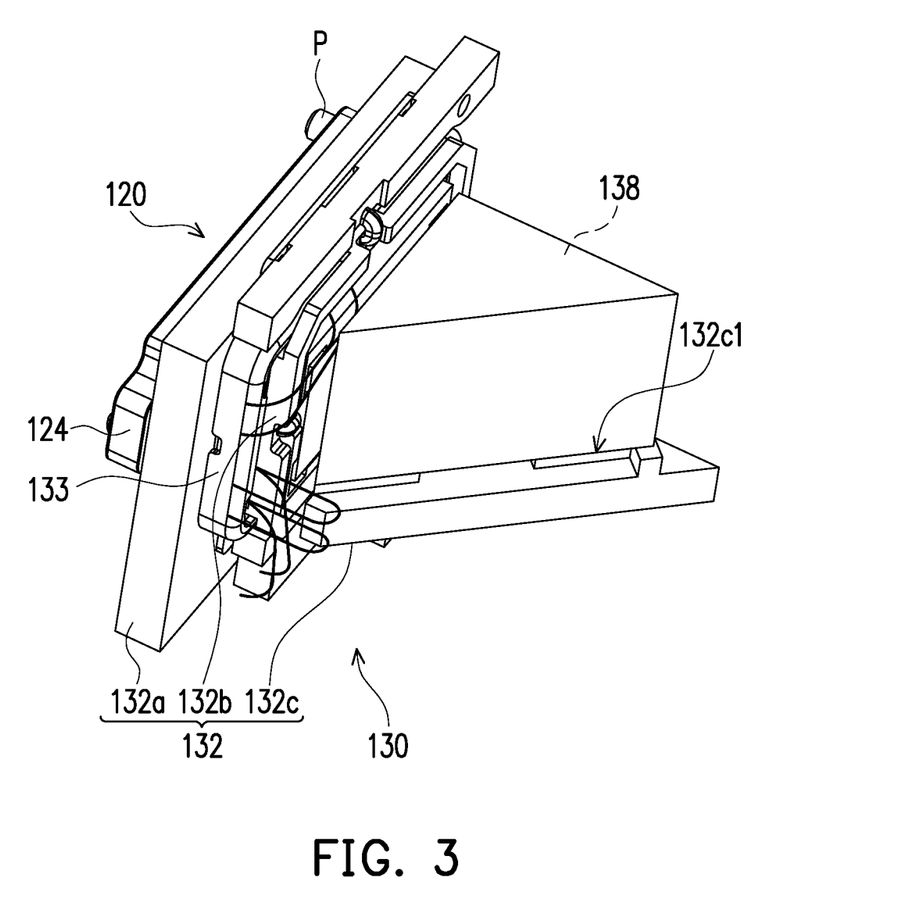
FIG. 3 is a three-dimensional view of the optical module and the light valve component in FIG. 2.
Figure 4:
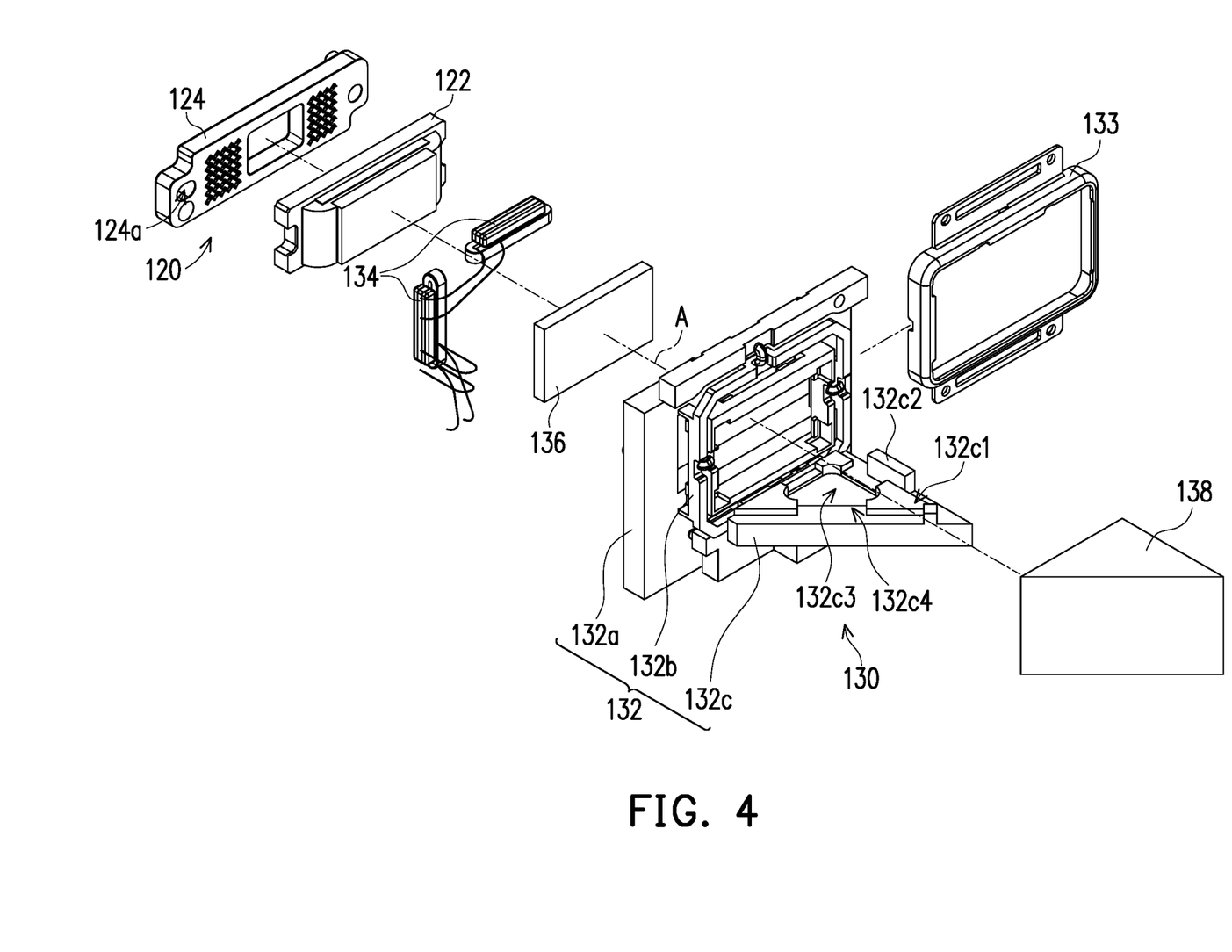
FIG. 4 is an exploded view of the optical module and the light valve component in FIG. 3.

FIG. 3 is a three-dimensional view of the optical module and the light valve component in FIG. 2. FIG. 4 is an exploded view of the optical module and the light valve component in FIG. 3. With reference to FIG. 3 and FIG. 4, the optical module 130 in this embodiment includes a bracket 132, a driving component 134, an optical component 136, and a light guide element 138. The optical component 136 is, for instance, a lens and is movably disposed on the bracket 132 and located on the transmission path of the image beam L2 (shown in FIG. 1). In this embodiment, the bracket 132 may include a frame portion 132a and at least one frame 132b. The frame 132b is oscillatably connected to the frame portion 132a, and the optical component 136 is disposed on the frame 132b and movably located in the frame portion 132a. The driving component 134 includes, for instance, at least one set of an electric magnet and a coil, which is disposed between the bracket 132 and the optical component 136 and configured to drive the frame 132b and the optical component 136 on the frame 132b to oscillate, so that the image beam L2 (shown in FIG. 1) passing through the optical component 136 has a better resolution. Further, the optical module 130 further includes a side frame 133 that is disposed at the bracket 132 and covers the driving component 134. The light guide element 138 is disposed at the bracket 132 and located on the transmission path of the image beam L2 (shown in FIG. 1). In this embodiment, the light guide element 138 is, for instance, a reflective prism with a coating film. The illumination beam L1 may be transmitted to the light valve component 120 through the light guide element 138 to generate the image beam L2, and the image beam L2 is reflected back to the light guide element 138. One surface of the light guide element 138 having the coating film reflects the image beam L2, so as to transmit the image beam L2 to the projection lens 140. The form and the type of the light guide element 138 are not limited in the invention. In other embodiments, the transmission path of the illumination beam L1 and the transmission path of the image beam L2 may be changed. Sufficient teachings, suggestions, and implementation descriptions of the detailed steps and the manner of the implementation of the transmission path or the method of transmitting the illumination beam L1 and the image beam L2 by the light guide element 138 may be obtained from the general knowledge of the pertinent field to which they belong and thus will not be repeated herein. The projection lens 140 (shown in FIG. 1 and FIG. 2) is configured to project the image beam L2 from the light guide element 138. In addition, the light valve component 120 may be disposed at the bracket 132, or the light valve component 120 may not be disposed at the bracket 132. FIG. 3 and FIG. 4 illustrate the light valve component 120 to show the relative positional relationship between the optical module 130 and the light valve component 120, and the light valve component 120 is not limited to be disposed at the bracket 132.

With the above arrangement, the driving component 134, the optical component 136, the light guide element 138, and the light valve component 120 share one single bracket 132 and are modularized. Therefore, in the process of assembling the projector 100A, as long as the modularized components are installed in the casing 100a (shown in FIG. 2) in the projector 100A, it is equivalent to the assembly of a plurality of components; hence, the assembly process provided herein is relatively simple and does not require the use of different fixtures to assemble the components. As such, the relevant labor and costs may be reduced, and the reduced yield caused by cumulative errors resulting from sequentially assembling the components may be avoided.

In detail, the bracket 132 provided in the embodiment further includes a platform portion 132c, and the platform portion 132c is integrally connected to the frame portion 132a. The platform portion 132c extends from the frame portion 132a in a direction parallel to an optical axis A (shown in FIG. 2 and FIG. 4) of the optical component 136, and the platform portion 132c has a supporting surface 132c1 parallel to the optical axis A. The light guide element 138 is held on the supporting surface 132c1. In addition, the platform portion 132c has a stopper bump 132c2 extending from the supporting surface 132c1 in a direction perpendicular to the optical axis A of the optical component 136, and the light guide element 138 leans against the stopper bump 132c2. The platform portion 132c further has a recess 132c3 on the supporting surface 132c1, the recess 132c3 is configured to accommodate an adhesive, and the light guide element 138 is adhered to the platform portion 132c by the adhesive. The platform portion 132c also has at least one overflow channel 132c4 on the supporting surface 132c1, and the at least one overflow channel 132c4 adjoins the recess 132c3 for draining out the excess adhesive. In other embodiments, the light guide element 138 may be assembled to the bracket 132 in another appropriate manner, which is not limited to what is provided in the invention.

Figure 5:
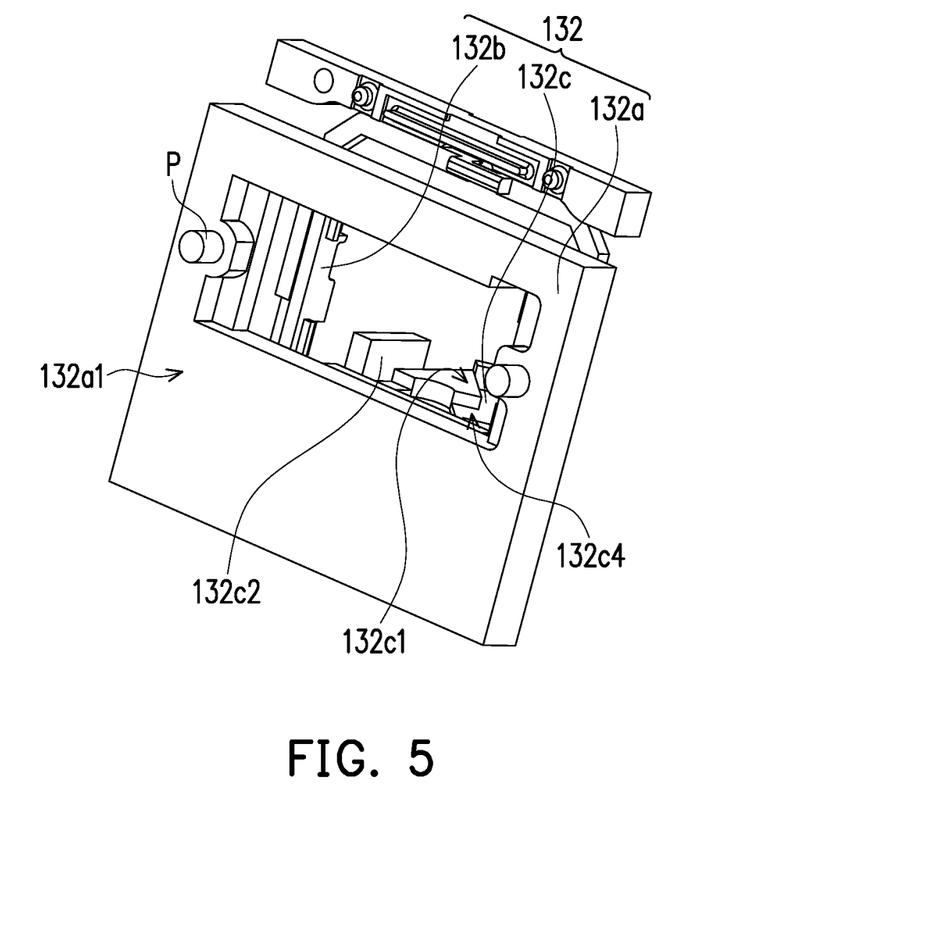
FIG. 5 is a three-dimensional view of the bracket in FIG. 4 at another view angle.

FIG. 5 is a three-dimensional view of the bracket in FIG. 4 at another view angle. In the embodiment which discloses that the light valve component 120 is disposed at the bracket 132, the frame portion 132a of the bracket 132 has a bearing surface 132a1 as shown in FIG. 5 and at least one positioning column P (illustrated as two) on the bearing surface 132a1. The light valve component 120 includes a light valve main body 122 and a light valve connector 124 as shown in FIG. 4, the light valve main body 122 leans against the bearing surface 132a1 and is sandwiched between the light valve connector 124 and the frame portion 132a, the light valve connector 124 of the light valve component 120 has at least one positioning hole 124a (illustrated as two), and the two positioning columns P are respectively inserted into the two positioning holes 124a to position the light valve component 120 at the bracket 132. In other embodiments, the light valve component 120 may be assembled to the bracket 132 in another appropriate manner. For instance, the light valve connector 124 has a positioning column, and the frame portion 132a has a positioning hole on the bearing surface 132a1; alternatively, both the light valve connector 124 and the bearing surface 132a1 of the frame portion 132a have screw holes, which can also be used in combination with screws or the like for assembly.

Figure 6:
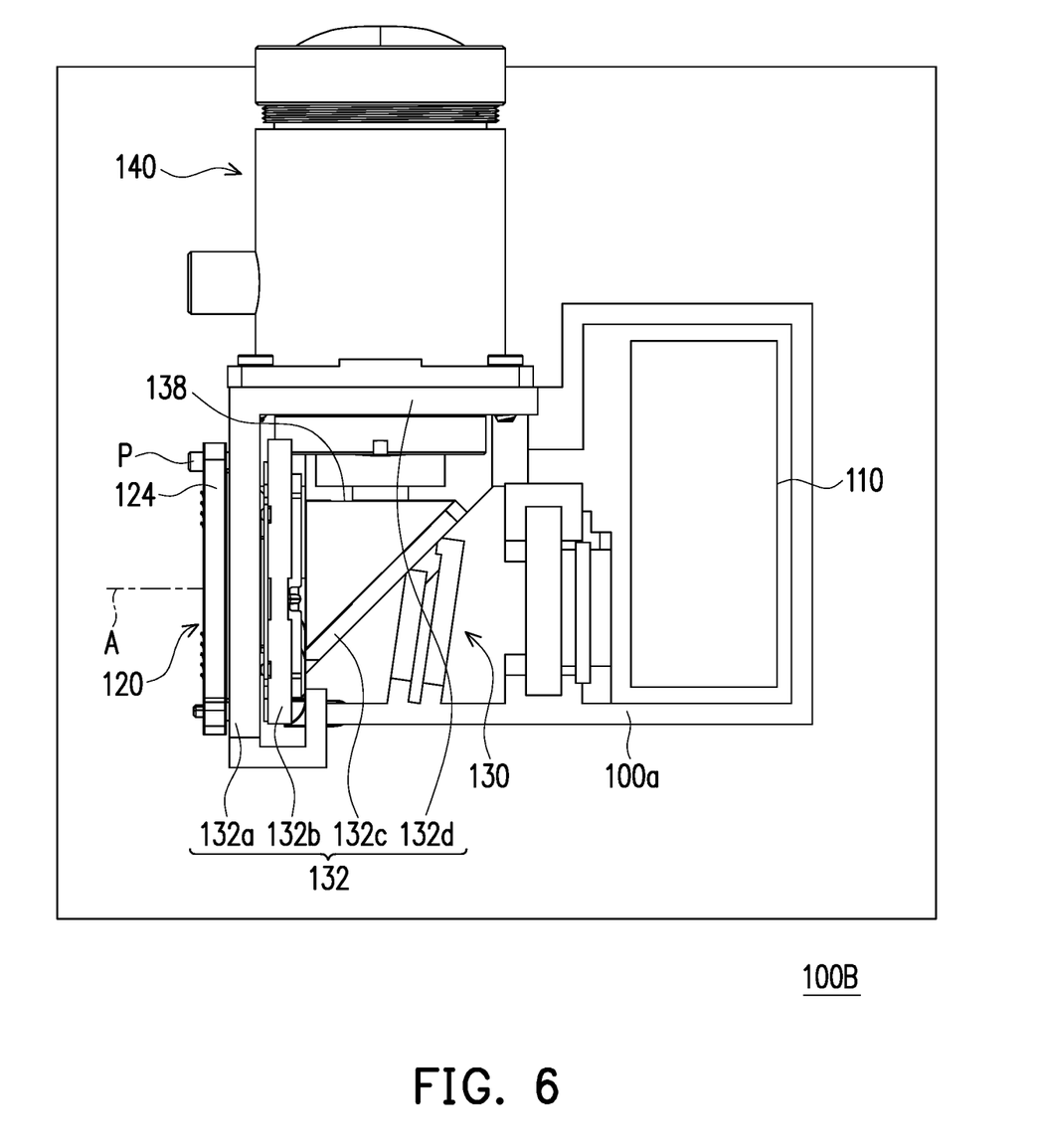
FIG. 6 is a schematic top view of a projector according to another embodiment of the invention.
Figure 7:
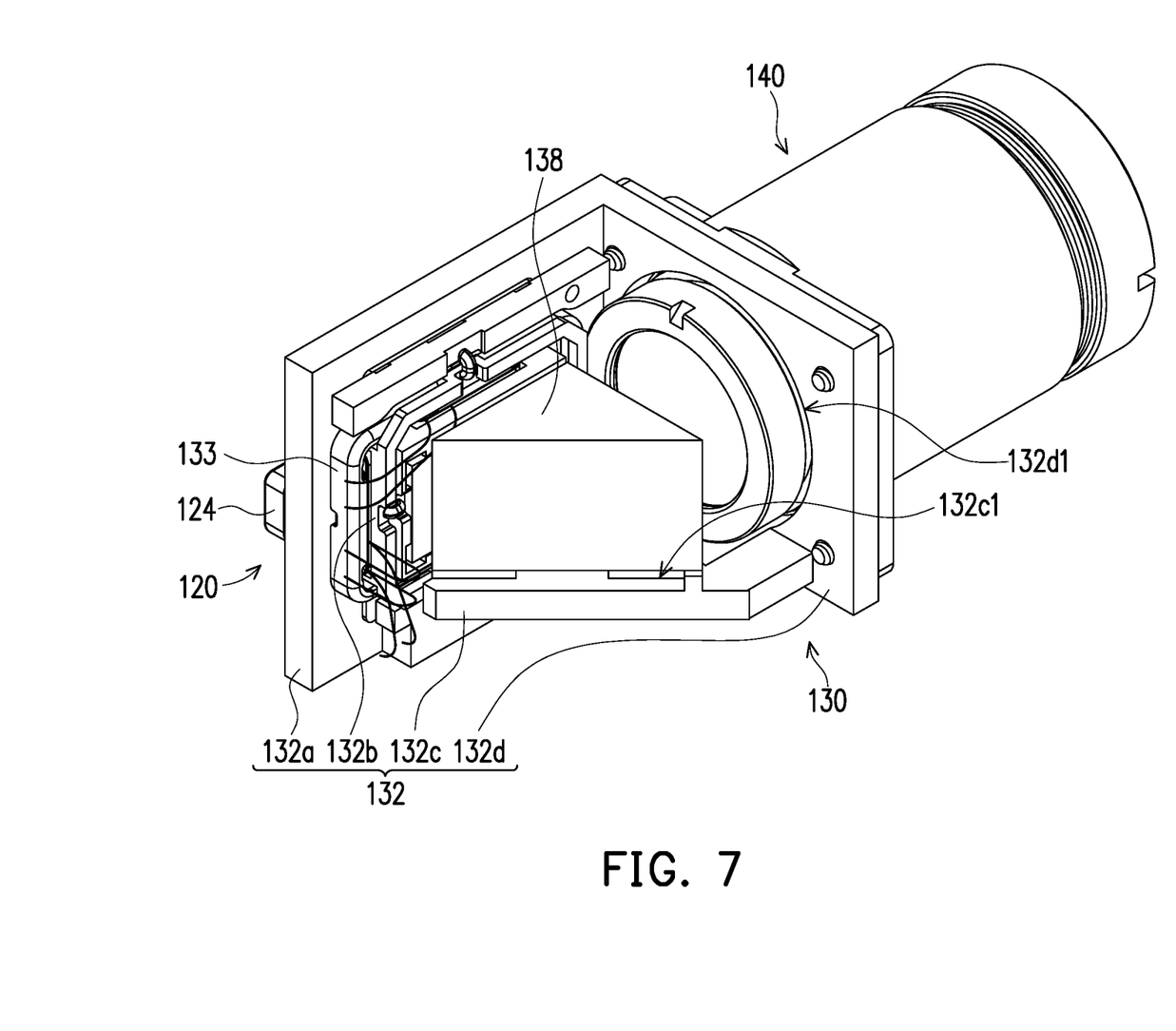
FIG. 7 is a three-dimensional view of the optical module, the light valve component, and the projection lens in FIG. 6.
Figure 8:
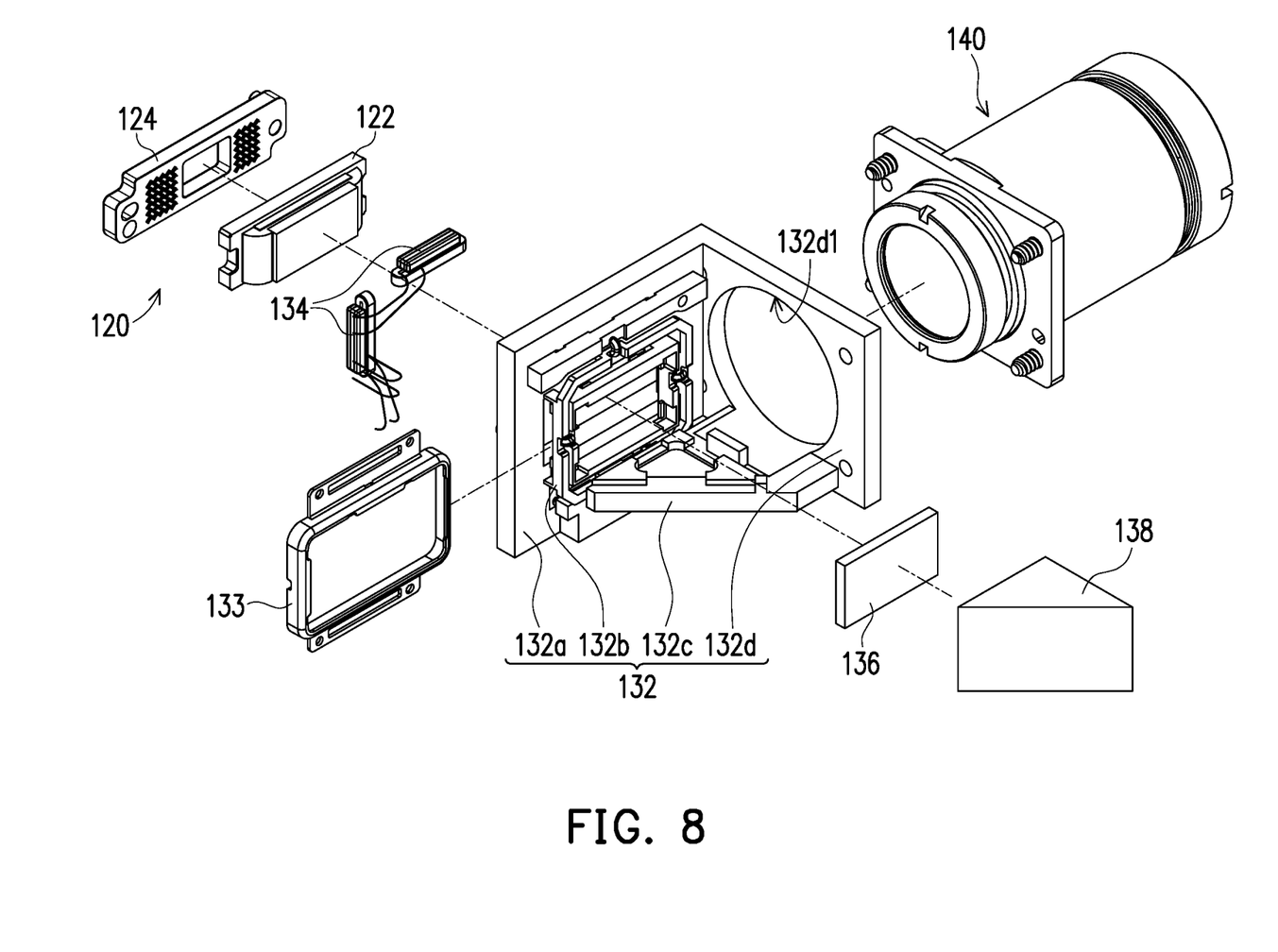
FIG. 8 is an exploded view of the optical module, the light valve component, and the projection lens in FIG. 7.

FIG. 6 is a schematic top view of a projector according to another embodiment of the invention. FIG. 7 is a three-dimensional view of the optical module, the light valve component, and the projection lens in FIG. 6. FIG. 8 is an exploded view of the optical module, the light valve component, and the projection lens in FIG. 7. A projector 100B shown in FIG. 6 to FIG. 8 is different from the projector 100A provided in the foregoing embodiment, and the difference lies in that the projection lens 140 of the projector 100B is disposed at the bracket 132. That is, in the projector 100B provided in the embodiment, the driving module 134, the optical module 136, the light guide element 138, and the light valve module 120 share one single bracket 132 and are modularized; moreover, the projection lens 140 and said components share the bracket 132, so as to further simplify the assembly process of the projector 100B.

In detail, the bracket 132 provided in the embodiment further includes a wall portion 132d integrally connected to the frame portion 132a. The wall portion 132d has an opening 132d1. The projection lens stalled on the wall portion 132d, and one end of the projection lens 140 passes through the opening 132d1. In other embodiments, the projection lens 140 may be assembled to the bracket 132 in another appropriate manner, which should not be construed as a limitation to the invention. The other configurations of the projector 100B shown in FIG. 6 to FIG. 8 and the projector 100A provided in the foregoing embodiment are the same or similar and thus will not be further described hereinafter. Besides, in other embodiments where the projection lens 140 is assembled to the bracket 132, the light valve component 120 may not be disposed at the bracket 132. FIG. 7 and FIG. 8 illustrate the light valve component 120 to show the relative positional relationship between the optical module 130 and the light valve component 120, and the light valve component 120 is not limited to be disposed at the bracket 132.

Figure 9:
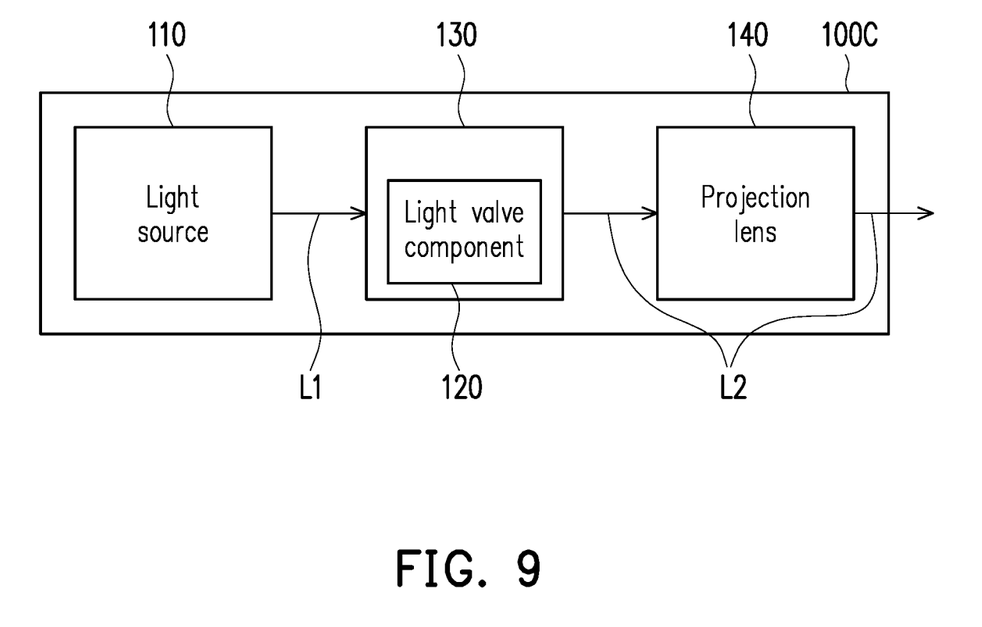
FIG. 9 is a schematic block diagram of a projector according to another embodiment of the invention.
Figure 10:
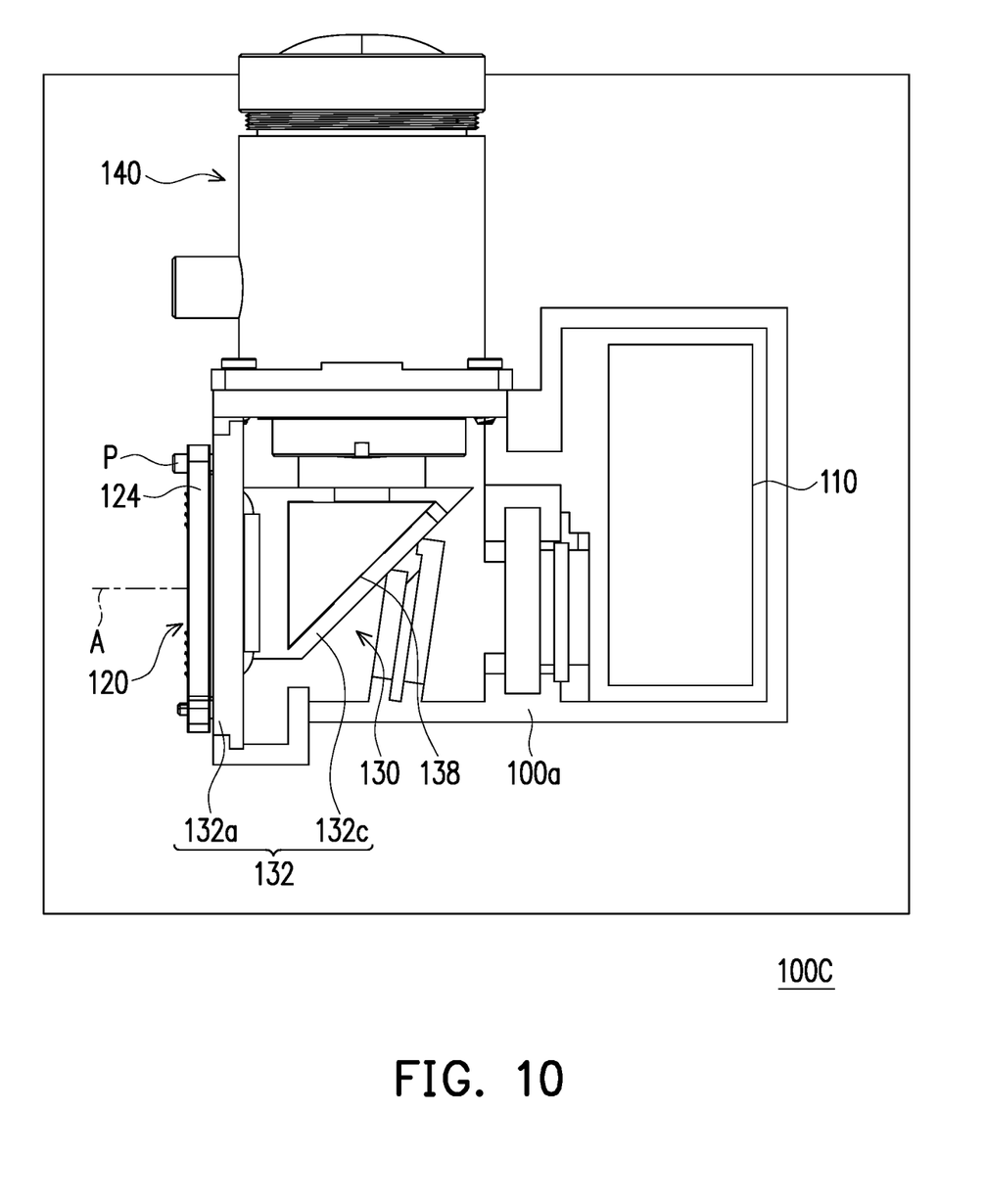
FIG. 10 is a schematic top view of the projector in FIG. 9.
Figure 11:
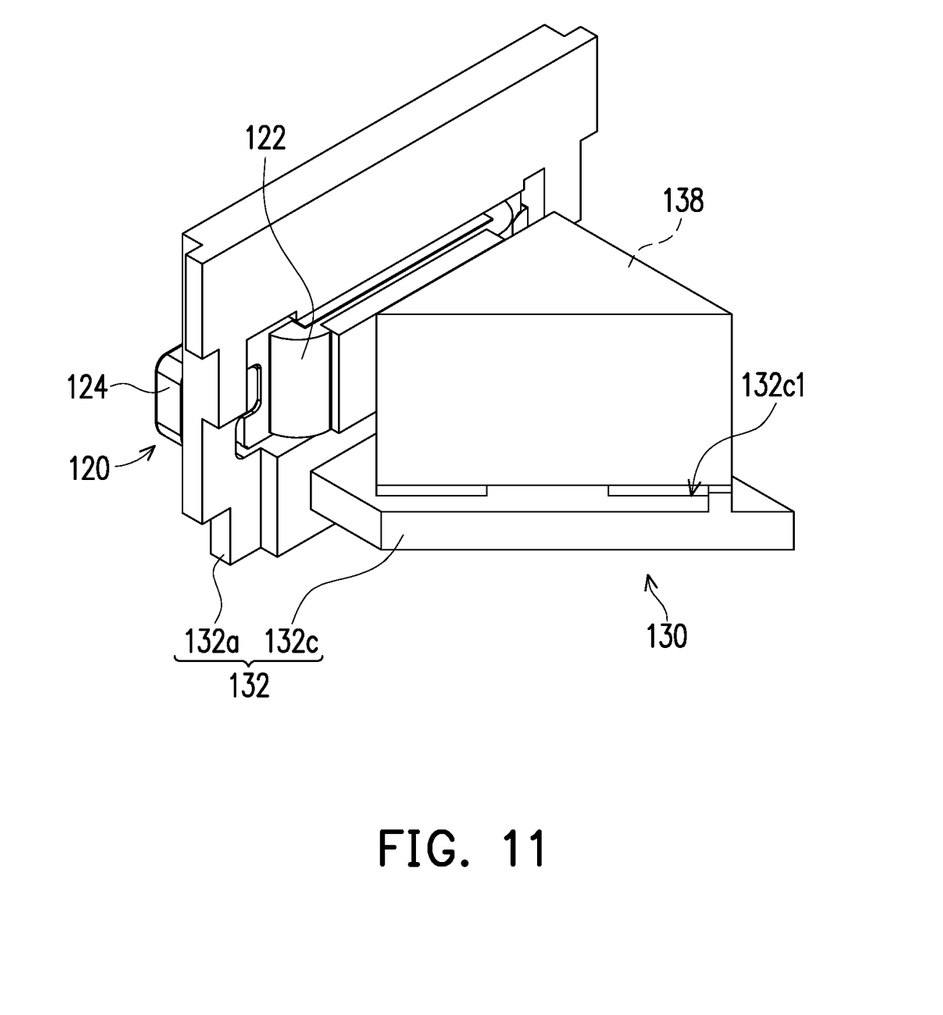
FIG. 11 is a three-dimensional view of the optical module in FIG. 10.
Figure 12:
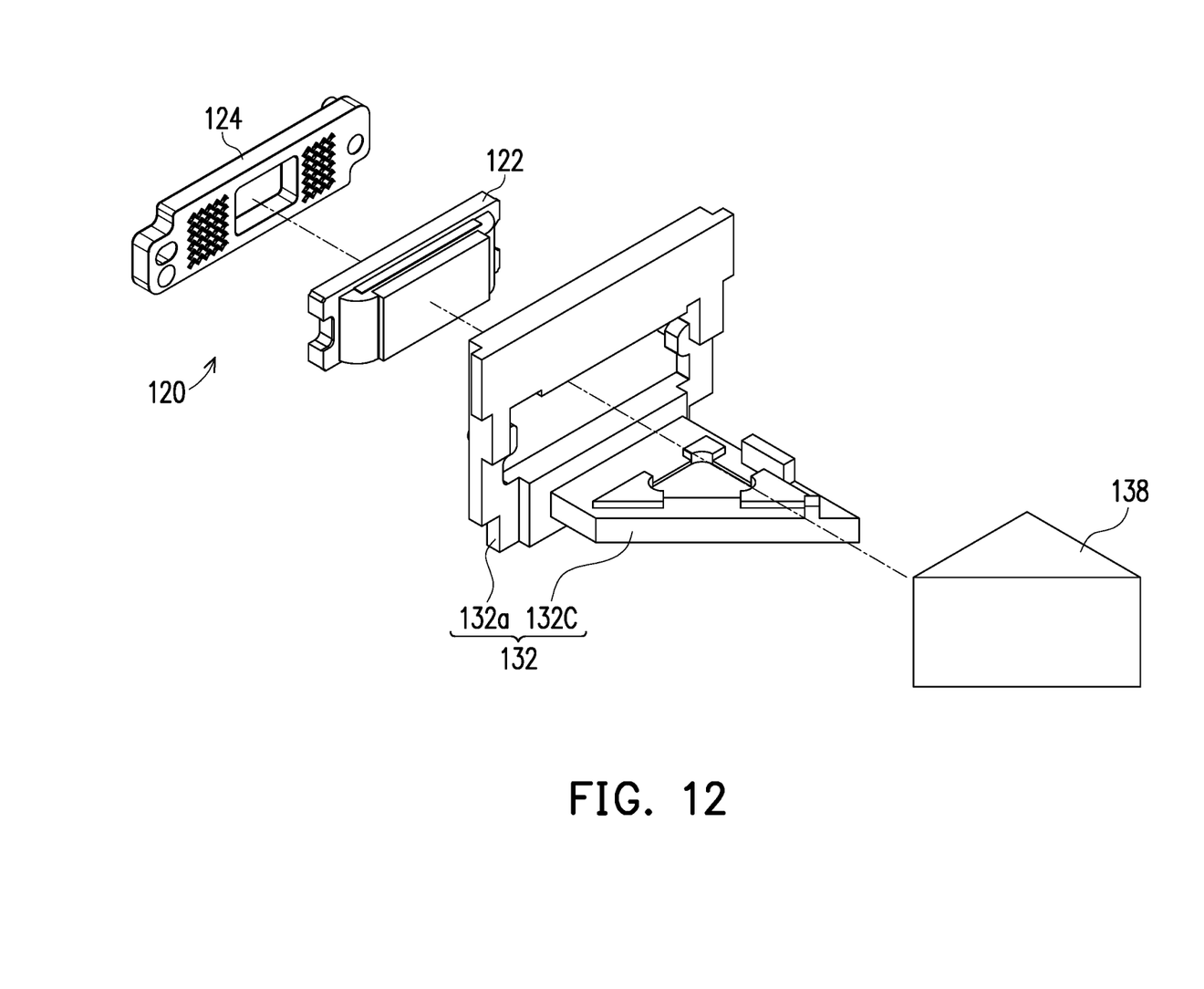
FIG. 12 is an exploded view of the optical module in FIG. 11.

FIG. 9 is a schematic block diagram of a projector according to another embodiment of the invention. FIG. 10 is a schematic top view of the projector in FIG. 9. With reference to FIG. 9 and FIG. 10, a projector 100C provided in the embodiment includes a light source 110, an optical module 130, and a projection lens 140. The light source 110 is configured to provide an illumination beam L1. The optical module 130 is disposed between the light source 110 and the projection lens 140, and the optical module 130 includes a light valve component 120, a bracket 132, and a light guide element 138. The light valve component 120 is disposed at the bracket 132 and configured to convert the illumination beam L1 to the image beam L2, and the light guide element 138 is disposed on the bracket 132 and located on the transmission path of the image beam L2. The projection lens 140 is configured to project the image beam L2. FIG. 11 is a three-dimensional view of the optical module in FIG. 10. FIG. 12 is an exploded view of the optical module in FIG. 11. The difference between the projector 100C shown in FIG. 9 to FIG. 12 and the projector 100A provided in the foregoing embodiment lies in that the optical module 130 of the projector 100C does not include the optical component 136, the driving component 134, and the side frame 133 described above; by contrast, the bracket 132 does not include the frame 132b provided above. To be specific, the optical module 130 of the projector 100C is mainly modularized by disposing the light valve component 120 and the light guide element at the bracket 132. The other configurations of the projector 100C shown in FIG. 9 to FIG. 12 and the projector 100A provided in the foregoing embodiment are the same or similar and thus will not be further described hereinafter.

To sum up, one or more embodiments of the invention provide at least one of the following advantages or effects. In the optical module provided in one or more embodiments of the invention, the components (such as the driving component, the optical component, and the light guide element, or the light valve component and the light guide element) share one single bracket and are modularized. Therefore, in the process of assembling the projector, as long as the modularized components are installed in the casing of the projector, it is equivalent to the assembly of a plurality of components; hence, the assembly process provided herein is relatively simple and does not require the use of different fixtures to assemble the components. As such, the relevant labor and costs may be reduced, and the reduced yield caused by cumulative errors resulting from sequentially assembling the components may be avoided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. An optical module comprising a bracket, a driving component, an optical component, and a light guide element, wherein:
   the optical component is movably disposed on the bracket and located on a transmission path of an image beam, the driving component is disposed between the bracket and the optical component and configured to drive the optical component to oscillate,
   the light guide element is disposed at the bracket and located on the transmission path of the image beam, and
   the bracket comprises a frame portion and a platform portion connected to each other, the optical component is movably disposed in the frame portion, the platform portion has a supporting surface, and the light guide element is held on the supporting surface.

2. The optical module according to claim 1, wherein the platform portion extends from the frame portion in a direction parallel to an optical axis of the optical component, and the supporting surface is parallel to the optical axis.

3. The optical module according to claim 1, wherein the platform portion has a stopper bump extending from the supporting surface in a direction perpendicular to an optical axis of the optical component, and the light guide element leans against the stopper bump.

4. The optical module according to claim 1, wherein the platform portion has a recess on the supporting surface, the recess is configured to accommodate an adhesive, and the light guide element is adhered to the platform portion by the adhesive.

5. The optical module according to claim 4, wherein the platform portion has at least one overflow channel on the supporting surface, and the at least one overflow channel adjoins the recess.

6. The optical module according to claim 1, wherein the platform portion is integrally connected to the frame portion.

7. The optical module according to claim 1, wherein the bracket has a bearing surface configured to receive a light valve component.

8. The optical module according to claim 7, wherein the bracket has at least one positioning column on the bearing surface, the light valve component has at least one positioning hole, and the at least one positioning column is inserted into the at least one positioning hole to position the light valve component at the bracket.

9. The optical module according to claim 1, wherein the bracket comprises a wall portion connected to the frame portion, the wall portion has an opening and is configured to install a projection lens, and the opening is configured to allow one end of the projection lens to pass through.

10. The optical module according to claim 9, wherein the wall portion is integrally connected to the frame portion.

11. A projector comprising a light source, a light valve component, an optical module, and a projection lens, wherein:

the light source is configured to provide an illumination beam;

the light valve component is configured to convert the illumination beam into an image beam;

the optical module comprises a bracket, a driving component, an optical component, and a light guide element, wherein:

the optical component is movably disposed on the bracket and located on a transmission path of the image beam, the driving component is disposed between the bracket and the optical component and configured to drive the optical component to oscillate, the light guide element is disposed at the bracket and located on the transmission path of the image beam, and the bracket comprises a frame portion and a platform portion connected to each other, the optical component is movably disposed in the frame portion, the platform portion has a supporting surface, and the light guide element is held on the supporting surface; and the projection lens is configured to project the image beam from the light guide element.

12. The projector according to claim 11, wherein the light valve component is disposed at the bracket.

13. The projector according to claim 12, wherein the bracket has a bearing surface, and the light valve component leans against the bearing surface.

14. The projector according to claim 11, wherein the projection lens disposed at the bracket.

15. The projector according to claim 14, wherein the bracket comprises a wall portion connected to the frame portion, the wall portion has an opening, the projection lens is installed at the wall portion, and one end of the projection lens passes through the opening.

16. An optical module comprising a bracket, a light valve component, and a light guide element, wherein:

the light valve component is disposed at the bracket and configured to convert an illumination beam into an image beam, the light guide element is disposed at the bracket and located on a transmission path of the image beam, and the bracket comprises a frame portion and a platform portion connected to each other, the light valve component is disposed on one side of the frame portion, the platform portion is located on the other side of the frame portion and has a supporting surface, and the light guide element is held on the supporting surface.

17. The optical module according to claim 16, wherein the platform portion extends from the frame portion in a direction parallel to an optical axis of the light valve component, and the supporting surface is parallel to the optical axis.

18. The optical module according to claim 16, wherein the platform portion has a stopper bump extending from the supporting surface in a direction perpendicular to an optical axis of the light valve component, and the light guide element leans against the stopper bump.

19. The optical module according to claim 16, wherein the platform portion has a recess on the supporting surface, the recess is configured to accommodate an adhesive, and the light guide element is adhered to the platform portion by the adhesive.

20. The optical module according to claim 19, wherein the platform portion has at least one overflow channel on the supporting surface, and the at least one overflow channel adjoins the recess.

21. The optical module according to claim 16, wherein the platform portion is integrally connected to the frame portion.

22. The optical module according to claim 16, wherein the bracket has a bearing surface, and the light valve component leans against the bearing surface.

23. The optical module according to claim 22, wherein the bracket has at least one positioning column on the bearing surface, the light valve component has at least one positioning hole, and the at least one positioning column is inserted into the at least one positioning hole to position the light valve component at the bracket.

24. A projector comprising a light source, an optical module, and a projection lens, wherein:

the light source is configured to provide an illumination beam;

the optical module comprises a bracket, a light valve component, and a light guide element, wherein:

the light valve component is disposed at the bracket and configured to convert the illumination beam into an image beam;

the light guide element is disposed at the bracket and located on a transmission path of the image beam; and the bracket comprises a frame portion and a platform portion connected to each other, the light valve component is disposed on one side of the frame portion, the platform portion is located on the other side of the frame portion and has a supporting surface, and the light guide element is held on the supporting surface; and the projection lens is configured to project the image beam from the light guide element.

* * * * *